United States Patent [19]

Fink

[11] 3,870,281
[45] Mar. 11, 1975

[54] COMPRESSED AIR VIBRATOR
[75] Inventor: Willy Fink, Zollikerberg, Switzerland
[73] Assignee: Findeva AG, Zollikerberg, Switzerland
[22] Filed: Nov. 2, 1972
[21] Appl. No.: 303,141

[30] Foreign Application Priority Data
Dec. 15, 1971 Switzerland.................. 18296/71

[52] U.S. Cl. ......................... 259/1 R, 259/DIG. 43
[51] Int. Cl. ............................................ B01f 11/00
[58] Field of Search...415/54, 503; 259/1 R, DIG. 43, 259/DIG. 44

[56] References Cited
UNITED STATES PATENTS
1,346,221  7/1920  Liedtke.................... 259/DIG. 43
2,675,777  4/1954  Lachaise.................. 259/DIG. 43

Primary Examiner—Peter Feldman
Assistant Examiner—Alan Cantor
Attorney, Agent, or Firm—Toren, McGeady and Stanger

[57] ABSTRACT

In a compressed air vibrator having a cylindrically shaped casing each end of the casing is closed by a plastic cover. The plastic covers each have a frusto-conically shaped circumferential edge with a resilient lip formed in the circumferential edge for engagement in sealing contact with a portion of the surface of a groove formed in the interior surface of the casing adjacent its end.

3 Claims, 2 Drawing Figures

COMPRESSED AIR VIBRATOR

SUMMARY OF THE INVENTION

The present invention is directed to a compressed air vibrator having a cylindrical casing with covers closing the open ends of the casing and, more particularly, it is directed to plastic covers for closing the open ends of the casing.

Compressed air vibrators having a cylindrical casing with covers fitted into the open ends of the casing are well known and they are used for various purposes, for example, for compressing powdered or granular material or for aerating powdered material in filling and dosing plants. Such vibrators can be designed in a number of different ways. A common feature of the different embodiments of this type of fibrator is an eccentric mass which is set in revolution within the cylindrical casing by the compressed air passing through the casing which provides the desired vibration. In the presently known vibrators, the covers closing the ends of the casing have been made of metal and have been secured to the casing with the interposition of a gasket. This type of vibrator is relatively expensive, because it requires several machining operations.

The primary object of the present invention is to provide a construction of the vibrator casing and covers which simplify the manufacture and assembly of the vibrator and also reduce its costs.

In accordance with the present invention, the covers for the openings in the end of the casing are formed of a plastic material and the circumferential edge of the cover has a frusto-conical shape tapering inwardly toward the interior of the casing. An elastically deformable lip is provided around the circumferential edge of the cover for engagement in sealing contact with a groove formed in the inner surface of the casing adjacent its ends. Both the lip on the cover and a surface within the groove in the casing extend perpendicularly to the axis of the casing and are arranged to engage one another in sealing contact.

Due to the configuration of their circumferential edges, the covers can be easily pressed from the exterior of the casing into the grooves within the casing opening so that the lip on the cover deforms elastically and snaps resiliently into the groove. When compressed air is introduced into the interior of the casing, the perpendicular end face on the lip of the cover is pressed against the correspondingly arranged surface in the groove so that a seal is automatically achieved for preventing the escape of compressed air.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
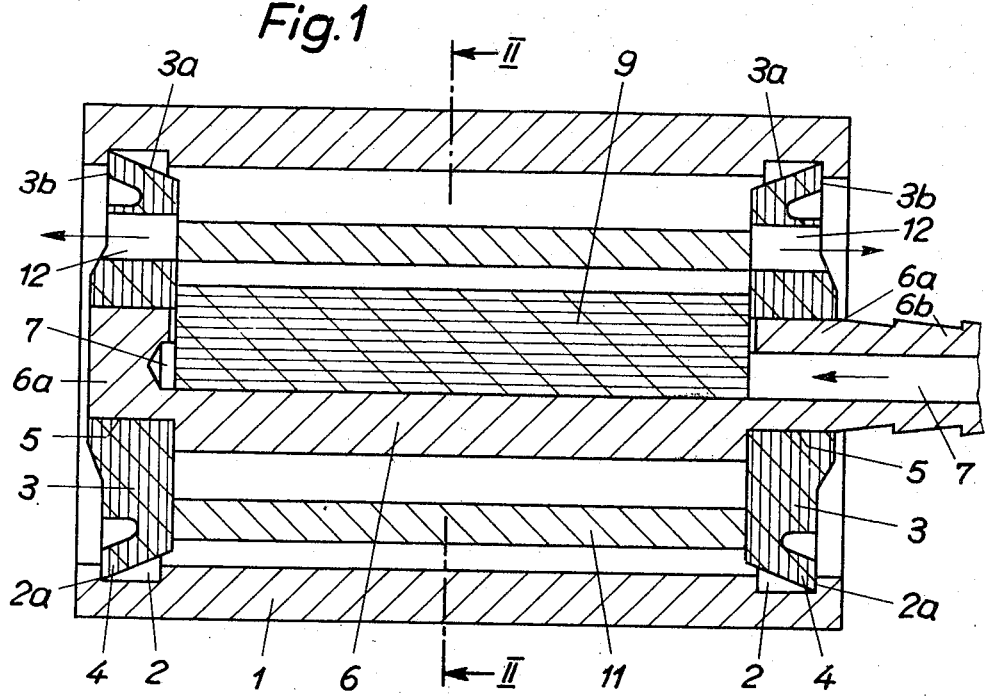
FIG. 1 is a longitudinal sectional view through a compressed air vibrator embodying the present invention, taken along the line I—I in FIG. 2.

In the drawing a compressed air vibrator is illustrated having a cylindrical casing open at its opposite ends. In the inner surface of the casing adjacent each of its open end faces is an annular groove 2 having at least one side wall 2a extending perpendicularly to the axis of the casing. As can be seen in FIG. 1, the wall 2a is the surface of the groove closer to the open end face of the casing.

Into each of the opposite open ends of the casing, a plastic cover 3 is inserted so that it seats within the groove 2. Each cover 3 has a frusto-conically shaped circumferentially extending edge or side 3a. Spaced closely radially inwardly of the circumferential edge of the cover, on its outwardly facing surface, is an annular groove 3c which defines the radially inner surface of an elastically deformable lip 4 extending about the circumference of the cover on its outwardly facing surface. The end face 3b of the lip 4, that is its surface facing outwardly in the axial direction of the casing, is disposed perpendicular to the axis of the casing and bears in sealing contact against the correspondingly disposed surface 2a of the groove 2.

The covers 3 are relatively thick and each has a central bore 5 in which a journal 6a of a fixed axle 6 is positioned. Additionally, an axially extending bore 7 extends through the axle 6. At one end, the journal 6a projects outwardly through the cover 3 and forms a nipple 6b for the attachment of a compressed air line. As indicated in FIG. 1, the bore 7 extends through the nipple 6b.

Figure 2:
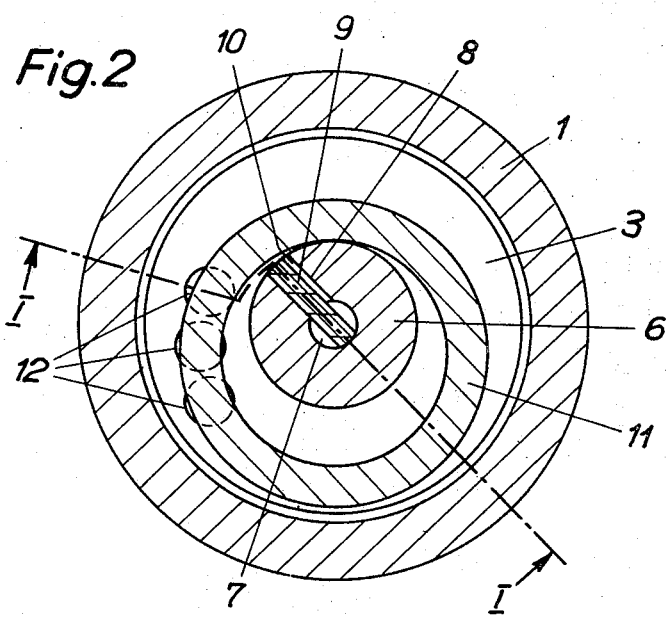
FIG. 2 is a sectional view taken along the line II—II in FIG. 1.

For its extent between the inside surfaces of the covers 3, the axle has an elongated slot 8 which opens into the bore 7. Positioned within the slot 8 is a slide valve 9 formed, for example, of plastic. As can be seen in FIG. 2, the width of the slide valve is somewhat less than that of the slot 8 so that an elongated gap 10 is provided for the escape of compressed air.

Within the casing 1, an eccentric mass in the form of a freely moving rotor 11 is provided. The rotor 11 has the form of a hollow metal cylinder and bears, in the rest position, on the top surface of the axle 6 but its outside diameter is such that it does not touch the inner wall surface of the casing. Each of the covers 3, in one portion thereof, contain outlet ports 12 for the compressed air. In the rest position of the rotor 11 shown in FIG. 2, the holes or ports 12 are covered by the end faces of the rotor.

The above described arrangement and the manner of operation of these compressed air vibrators are known. The compressed air entering the casing through the bore 7 flows through the gap 10 and exerts a torque on the rotor 11. As a result, the rotor begins to rotate and periodically opens the ports 12 and then closes them again.

The arrangement of the covers 3, but without the central bores 5, can be used for compressed air vibrators which employ a ball as the eccentric mass. In both such embodiments of the vibrator, an additional pressure is exerted by the lip 4 on the corresponding wall of the groove 2 due to pressure within the casing and, as a result, a better sealing effect is achieved.

While a specific embodiment of the invention has been shown and described in detail to illustrate the application of the inventive principles, it will be understood that the invention may be embodied otherwise without departing from such principles.

What is claimed is:

1. A compressed air vibrator comprising a cylindrical casing open at its opposite ends, a cover for each of the opposite ends of said casing for forming closures therefor, wherein the improvement comprises that said casing has a circumferentially extending groove in its inner surface adjacent each of its open ends, each said cover is formed of a plastic material and has a circumferentially extending edge which fits into the groove in said casing, the circumferentially extending edge of each said cover has a tapered configuration converging inwardly toward the axis of said casing in the direction facing toward the opposite end of said casing, a resilient lip formed around the circumferential edge of each said cover on the outer surface thereof with said lip fitted into said groove and having a portion of its surface bearing in sealed engagement against a corresponding wall surface within said groove, an eccentric mass positioned within said casing and movable therein under the influence of compressed air, said grooves of said casing being formed with at least the surface thereof adjacent the end of said casing extending perpendicularly to the axis of said casing, and the portion of said lip of said cover bearing in sealed engagement against a corresponding wall surface of said groove being in bearing contact with said perpendicularly extending surface of said groove.

2. A compressed air vibrator, as set forth in claim 1, wherein each said cover has an annular groove formed in its outwardly facing surface relative to the interior of said casing so that the portion of said cover extending radially outwardly from said groove to the circumferentially extending edge thereof forms said resilient lip.

3. A compressed air vibrator, as set forth in claim 2, wherein the portion of said lip of said cover bearing in sealed engagement against said perpendicularly extending surface of said groove extends perpendicularly to the axis of said casing.

* * * * *